(12) United States Patent
Fukushi et al.

(10) Patent No.: US 7,148,300 B2
(45) Date of Patent: Dec. 12, 2006

(54) FLUOROELASTOMERS WITH IMPROVED PERMEATION RESISTANCE AND METHOD FOR MAKING THE SAME

(75) Inventors: Tatsuo Fukushi, Woodbury, MN (US); Allan T. Worm, North St. Paul, MN (US); Erik D. Hare, St. Paul, MN (US); Greggory S. Bennett, Hudson, WI (US); William D. Coggio, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 145 days.

(21) Appl. No.: 10/659,877

(22) Filed: Sep. 11, 2003

(65) Prior Publication Data

US 2004/0054055 A1    Mar. 18, 2004

Related U.S. Application Data

(60) Provisional application No. 60/410,138, filed on Sep. 12, 2002.

(51) Int. Cl.
    *C08F 116/12*    (2006.01)
(52) U.S. Cl. ............... 526/247; 526/255; 525/326.3
(58) Field of Classification Search ............... 526/247, 526/255; 525/326.3
    See application file for complete search history.

(56) References Cited

U.S. PATENT DOCUMENTS

| | | | |
|---|---|---|---|
| 3,450,684 A | 6/1969 | Darby | |
| 3,470,176 A | 9/1969 | Zollinger | |
| 3,523,118 A | 8/1970 | Emerson et al. | |
| 3,546,186 A | 12/1970 | Gladding et al. | |
| 3,817,960 A | 6/1974 | Resnick | |
| 4,181,679 A | 1/1980 | Psarras | |
| 4,243,770 A | 1/1981 | Tatemoto et al. | |
| 4,361,678 A | 11/1982 | Tatemoto et al. | |
| 4,368,308 A | 1/1983 | Yamabe et al. | |
| 4,418,186 A | 11/1983 | Yamabe et al. | |
| 4,487,903 A | 12/1984 | Tatemoto et al. | |
| 4,513,128 A | 4/1985 | Uschold | |
| 4,529,784 A | 7/1985 | Finlay | |
| 4,687,821 A | 8/1987 | Ezzell et al. | |
| 4,900,872 A | 2/1990 | Guglielmo et al. | |
| 4,943,622 A | 7/1990 | Naraki et al. | |
| 4,973,634 A | 11/1990 | Logothetis | |
| 4,983,680 A | 1/1991 | Ojakaar | |
| 5,214,115 A | 5/1993 | Langstein et al. | |
| 5,225,504 A | 7/1993 | Tatsu et al. | |
| 5,247,036 A | 9/1993 | Kruger et al. | |
| 5,349,093 A | 9/1994 | Oka et al. | |
| 5,384,374 A * | 1/1995 | Guerra et al. ............ 525/326.4 |
| 5,401,818 A | 3/1995 | Oka et al. | |
| 5,696,216 A * | 12/1997 | Kruger et al. ............... 526/247 |
| 5,891,974 A | 4/1999 | Saito et al. | |
| 5,902,868 A | 5/1999 | Saito et al. | |
| 5,910,552 A | 6/1999 | Saito et al. | |
| 6,191,208 B1 * | 2/2001 | Takahashi .................... 524/494 |
| 6,255,536 B1 | 7/2001 | Worm et al. | |
| 6,294,627 B1 * | 9/2001 | Worm et al. ................ 526/247 |
| 6,380,337 B1 | 4/2002 | Abe et al. | |
| 6,613,846 B1 * | 9/2003 | Hintzer et al. ........... 525/326.2 |
| 6,642,331 B1 | 11/2003 | Apostolo et al. | |
| 6,730,760 B1 * | 5/2004 | Grootaert et al. ........... 526/247 |
| 2001/0000343 A1 | 4/2001 | Bowers | |
| 2001/0008922 A1 * | 7/2001 | Abe et al. ................ 525/326.3 |
| 2001/0047067 A1 | 11/2001 | Navarrini | |
| 2003/0088040 A1 | 5/2003 | Arrigoni et al. | |

FOREIGN PATENT DOCUMENTS

| | | |
|---|---|---|
| DE | 40 23 657 A1 | 1/1991 |
| DE | 195 42 501 A1 | 5/1997 |
| EP | 0 077 998 A2 | 5/1983 |
| EP | 0 130 052 A1 | 1/1985 |
| EP | 0 290 848 A1 | 11/1988 |
| EP | 0 208 314 B1 | 1/1991 |
| EP | 583481 A1 * | 2/1994 |
| EP | 0 834 521 A1 | 4/1998 |
| EP | 1 148 072 A2 | 10/2001 |
| EP | 1 160 258 A1 | 12/2001 |
| EP | 1 308 467 A2 | 5/2003 |
| JP | 2002-114824 | 4/2002 |
| WO | WO 93/22379 | 11/1993 |
| WO | WO 98/14517 | 4/1998 |
| WO | WO 98/58964 | 12/1998 |
| WO | WO-99/48939 * | 9/1999 |
| WO | WO 99/48939 | 9/1999 |
| WO | WO 02/44263 A1 | 6/2002 |
| WO | WO 02/060968 A1 * | 8/2002 |

(Continued)

OTHER PUBLICATIONS

U.S. Appl. No. 10/660,437, filed Sep. 11, 2003, Kaspar et al.

(Continued)

*Primary Examiner*—David W. Wu
*Assistant Examiner*—Henry S. Hu

(57) ABSTRACT

A compound is prepared, suitable for forming fluoroelastomers, having the unique features of a low glass transition temperature and desirable permeation resistance. The compound generally comprises two primary components. The first component is an amorphous copolymer including interpolymerized units derived from one or more perfluorinated ethers. The second component is a curable component including at least one filler having at least 10 parts per 100 parts of the first component. Upon vulcanization the resulting elastomeric compound has desirable physical characteristics as indicated by the durometer, the retraction at lower temperatures (TR-10) and permeation resistance.

19 Claims, No Drawings

FOREIGN PATENT DOCUMENTS

WO   WO-2004/024788 A1 * 3/2004

OTHER PUBLICATIONS

*Zhurnal Organicheskoi Khimii*, vol. 9, No. 2, pp. 226-228, Feb. 1973, "The Reactivity of Polyfluorinated Unsaturated Compounds With Respect To The Methyl Radical", (translation), S. V. Lebedev, Scientific-Research Institute of Synthetic Rubber.

Arcella, "New fluoroeastastomers for low temperature applications", presented at Arctic Rubber, Tampere, Jan. 30-Feb. 1, 1989, pp. 1-29.

Robert, "Natural Rubber Science and Technology", Oxford University Press, New York, 1988, pp. 198-199.

Brandrup et al., "Polymer Handbook, Second Edition", John Wiley & Sons, New York, 1975, pp. III-137-III-192.

Brandrup et al., "Polymer Handbook, Third Edition", John Wiley & Sons, New York, 1989, pp. VI209-VI277.

Emel'yanov et al., "Copolymerization of Perfluorooxaalkyl Allyl Ethers", Russian Journal of Organic Chemistry, 1994, vol. 30, No. 8, pp. 1331-1335.

Rodriguez, "Principles of Polymer Systems - Chapter 3, Physical States and Transitions", McGraw-Hill Book Company, 1970, pp. 26-48.

Marchionni et al., "Physical Properties of Perfluoropolyethers: Dependence on Composition and Molecular Weight", Polymer Engineering and Science, Jul. 1990, vol. 30, No. 14, pp. 829-834.

Pozzoli et al., "Melt-processable Perfluoropolymers", Modern Fluoropolymers, 1997, pp. 373-395.

Odian, "Principles of Polymerization, Third Edition", John Wiley & Sons, New York, 1991, pp. 1-39.

Painter et al., "Fundamentals of Polymer Science", Technomic Publishing Company, Inc., Pennsylvania, 1994, Chapter 8, pp. 247-287.

Schuman et al., "Development of Vulcanizable Elastomers Suitable for Use in Contact with Liquid Oxygen", J. Macromol. Sci. —Phys., Dec. 1967, vol. B1(4), pp. 815-830.

Sokolov et al., "New Fluorine Containing Elastomers and Polymeric Materials", Journal of D.I. Mendeleev Chemical Society of the USSR, 1991, vol. XXXVI, pp. 1-10, English Translation.

Kartsov et al., "The Role of the Reactor Surface in the Liquid-Phase Oxidation of Hexafluoropropylene", Plenum Publishing Corporation, 1979, pp. 2006-2010.

Ross et al., "Modern Fluoropolymers, Chapter 23, Liquid Fluoroelastomers", John Wiley & Sons, 1979, pp. 421-434.

Glazkov et al., "International of perfluoroalkylene oxides comprising peroxide groups with unsaturated perfluorinated compounds", Journal Organic Chemistry (Russian), 1994, vol. 30, No. 8, pp. 1193-1196.

* cited by examiner

FLUOROELASTOMERS WITH IMPROVED PERMEATION RESISTANCE AND METHOD FOR MAKING THE SAME

CROSS REFERENCE TO RELATED APPLICATION

This application claims priority to U.S. Provisional Patent Application No. 60/410,138, filed Sep. 12, 2002.

FIELD OF THE INVENTION

The present invention relates to a compound suitable for forming a fluoroelastomer having distinguished low temperature characteristics and improved permeation resistance. The present invention also includes a process for producing the fluoroelastomer.

BACKGROUND OF THE INVENTION

Increasingly stringent evaporative fuel standards for automobiles and trucks demand that the fuel system component minimize the emission of fuel vapors through automotive components such as the fuel tank, fuel filler lines, fuel injector seals, and fuel seals. Elastomers employed in fuel seal applications generally require low temperature properties, e.g. glass transition temperature (Tg)<−20° C. to maintain sealing performance for cold weather. Various types of fluoroelastomers for fuel seals have been proposed to address these concerns. In general, the most successful of the elastomers generally contain perfluoromethylvinylether (PMVE). PMVE reduces the glass transition temperature but generally has an adverse effect upon permeation. Materials with the combination of improved low temperature sealing and better permeation resistant materials are needed to meet the regulations, which has consistently been moving toward zero fuel emission.

Because of the expense of the fluoroelastomer, especially PMVE monomer, it is often desirable to use an extender compounded with the fluoroelastomer. However, compared to other hydrocarbon elastomers, fluoroelastomer combined with a low loading filler provides an unusually high durometer. Thus rendering the compound ineffective for sealing applications.

Those skilled in the art of fluoroelastomers recognize that it is difficult to get low temperature performance while maintaining good permeation resistance. It would be an advantage to improve the fuel permeation rate of an elastomer while retaining low temperature performance.

SUMMARY OF THE INVENTION

The present invention is directed to a compound suitable for forming fluoroelastomers having the unique features of a low glass transition temperature and desirable permeation resistance. The compound generally comprises two main components. The first component is an amorphous copolymer including interpolymerized units derived from one or more perfluorinated ethers of the formula:

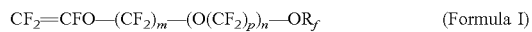  (Formula I)

wherein $R_f$ is a perfluorinated (C1–C4) alkyl group, m=1–4, n=0–6, and p=1–2, or

  (Formula II)

wherein: m=1–4; $R_f$ is a perfluorinated aliphatic group optionally containing O atoms.

The second component is a curable component including at least one filler having at least 10 parts per 100 parts of the first component. Upon vulcanization the resulting elastomeric compound has desirable physical characteristics as indicated by the durometer, the retraction at lower temperatures (TR-10) and the permeation resistance.

With respect to the durometer the present invention generally exhibits a Shore A hardness according to ASTM D2240-02 of 60 or greater and preferably 65–85.

The retraction at lower temperatures (TR-10) according to ASTM D 1329-88 is of −25° C. or less and preferably −30° C. or less.

The elastmeric compound also has a permeation rate (CE10) of 65 (g-mm/m2-day) or less and preferably 60 (g-mm/m2-day) or less. The noted physical characteristics make the fluoroelastomer well suited for sealing applications.

The compound of the present invention may generally include various copolymers terpolymers or quadpolymers in conjunction with the perfluorinated ethers. The preferred embodiment utilizes vinylidene fluoride to achieve the benificial physical characteristics while achieving desireable economics.

The compound of the present invention may be vulcanized using conventional methods. Further, the articles produced using the present compound are suitable for various sealing applications, including applications in the automotive industry.

DETAILED DESCRIPTION

The present invention is directed to a polymeric compound that is suitable for use, upon vulcanization, as a fluoroelastomer for sealing applications. The polymeric compound is generally a two component system comprising an amorphous copolymer that includes specific perfluorinated ethers. The second component is a curable component that includes at least one filler. The compound may include one or more conventional adjuvants, such as, for example, crosslinking agents such as peroxides, coagents, and acid acceptors. The perfluorinated ethers of the present invention assist in achieving the desired glass transition temperature and the fillers are directed to reducing the permeation rate of the resulting vulcanized article. For purposes of the present invention, an amorphous copolymer is one that has essentially no detectable melting endotherm or crystalline exotherm peak, as determined by differential scanning calorimetry (DSC).

The first component of the present invention is generally a copolymer that includes interpolymerized units of at least one perfluorinated ether and interpolymerized units of another conventional monomer. For purposes of the present invention, the term copolymer is intended to include a polymer derived from two or more monomeric units. In preferred embodiments, the present invention may include specific terpolymers or quadpolymers that are employed to achieve specific physical characteristics in the final vulcanized compound.

Non-limiting examples of suitable monomers include compositions selected from vinylidene fluoride, tetrafluoroethylene, hexafluoro propylene, vinyl ethers, chloro trifluoro ethylene, pentafluoropropylene, vinyl fluoride, propylene, and ethylene. Combinations of the noted monomers may also be employed in the first component of the present invention. The first component may also inlcude ethylenically unsaturated monomers of the formula $CF_2=CFR_f$ where $R_f$ is fluorine or perfluoroalkyl of 1 to 8 carbon atoms.

Those skilled in the art are capable of selecting specific monomers at appropriate amounts to form an elastomeric polymer. Thus the appropriate level of monomers, based on mole %, are selected to achieve an amorphous polymeric composition.

Preferably, the fluorocarbon polymers of the present invention include about 50–80 mole % of the repeating units derived from vinylidene fluoride (VF$_2$), and about 10–50 mole % of the repeating units derived from the perfluorinated ether of Formula I, with or without a halogen cure site. They can optionally include up to about 40 mole % of repeating units derived from a fluoromonoolefin other than the perfluorinated ether and vinylidene fluoride. Such other fluoromonoolefins include, for example, tetrafluoroethylene (TFE), hexafluoropropene (HFP), chlorotrifluoroethylene (CTFE), 1-hydropentafluoropropene, perfluoro(methylvinylether) perfluoro(propylvinylether), perflourocyclobutene, and perfluoro(methylcyclopropene). Optionally, the aforementioned one or more fluoromonoolefins may be copolymerized with fluorine-free olefinic monomers such as ethylene and propylene.

In a preferred embodiment, the present invention is a quadpolymer generated from tetrafluoroethylene, vinylidene fluoride, a perfluorinated vinyl ether of the formula $CF_2$=$CFOCF_2CF_2CF_2OCF_3$, and a perfluoroalkyl vinylether of the formula $CF_2$=$CFO(CF_2)_mCF_3$ wherein: m=0–4, and preferably perfluoromethyl vinylether. This specific embodiment exhibits desirable solvent swell and glass transition temperatures that are very desirable for sealing applications. The quadpolymer composition is fully detailed in U.S. Pat. No. 6,864,336, herein incorporated by reference in its entirety.

In an alternative preferred embodiment, the fluorocarbon polymers of the present invention include about 40–65 mole % of the repeating units derived from vinylidene fluoride (VF$_2$), and about 10–50 mole-% of the repeating units derived from the perfluorinated ether of Formula I, and about 1–15 mole-% of the repeating units derived from the perfluoromethyl vinylether of Formula II with or without a halogen cure site. They can optionally include up to about 40 mole % of repeating units derived from a fluoroolefin other than the perfluorinated ether and vinylidene fluoride. Such other fluoromonoolefins include, for example, hexafluoropropene (HFP), chlorotrifluoroethylene (CTFE), tetrafluoroethylene (TFE), 1-hydropentafluoropropene, perflourocyclobutene, and perfluoro(methylcyclopropene). Optionally, the aforementioned one or more fluoromonoolefins may be copolymerized with fluorine-free olefinic monomers such as ethylene and propylene.

One or more perfluorinated ethers are employed in the compound. The perfluorinated ethers have the formula of:

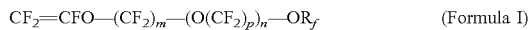
$$CF_2=CFO-(CF_2)_m-(O(CF_2)_p)_n-OR_f \quad \text{(Formula I)}$$

wherein R$_f$ is a perfluorinated (C1–C4) alkyl group, m=1–4, n=0–6, and p=1–2, or

$$CF_2=CF(CF_2)_m-O-R_f \quad \text{(Formula II)}$$

wherein: m=1–4; R$_f$ is a perfluorinated aliphatic group optionally containing O atoms.

The perfluorinated ethers are included in amounts that enable the formation of an amorphous compound. Those skilled in the art are capable of selecting an appropriate mole %, in combination with at least one other monomer, to achieve the desired properties.

The perfluorinated ether components result in a compound that is capable of retaining a preferred elasticity, as indicated by a Shore A hardness value, while retaining a desired retraction at lower temperature (TR-10). The retention of the flexibility and retraction at lower temperature (TR-10) enable the use of fillers in the compound at levels that enhance the permeation resistance of the vulcanized compound.

The most preferred perfluorinated ethers are selected from:

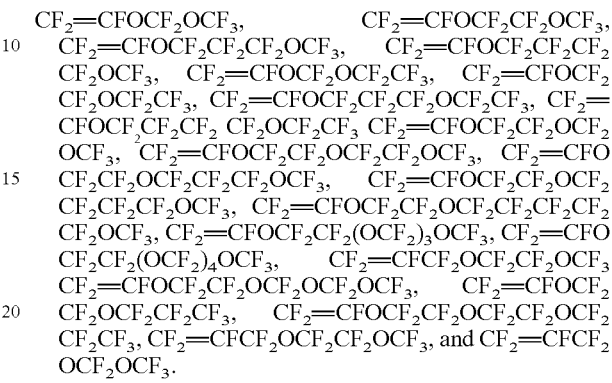

$CF_2$=$CFOCF_2OCF_3$, $CF_2$=$CFOCF_2CF_2OCF_3$, $CF_2$=$CFOCF_2CF_2CF_2OCF_3$, $CF_2$=$CFOCF_2CF_2CF_2CF_2OCF_3$, $CF_2$=$CFOCF_2OCF_2CF_3$, $CF_2$=$CFOCF_2CF_2OCF_2CF_3$, $CF_2$=$CFOCF_2CF_2CF_2OCF_2CF_3$, $CF_2$=$CFOCF_2CF_2CF_2CF_2OCF_2CF_3$ $CF_2$=$CFOCF_2CF_2OCF_2OCF_3$, $CF_2$=$CFOCF_2CF_2OCF_2CF_2OCF_3$, $CF_2$=$CFOCF_2CF_2OCF_2CF_2OCF_3$, $CF_2$=$CFOCF_2CF_2OCF_2CF_2CF_2OCF_3$, $CF_2$=$CFOCF_2CF_2OCF_2CF_2CF_2CF_2OCF_3$, $CF_2$=$CFOCF_2CF_2(OCF_2)_3OCF_3$, $CF_2$=$CFOCF_2CF_2(OCF_2)_4OCF_3$, $CF_2$=$CFCF_2OCF_2CF_2OCF_3$ $CF_2$=$CFOCF_2CF_2OCF_2OCF_3$, $CF_2$=$CFOCF_2CF_2OCF_2CF_3$, $CF_2$=$CFOCF_2CF_2OCF_2CF_2OCF_2CF_3$, $CF_2$=$CFCF_2OCF_2CF_2OCF_3$, and $CF_2$=$CFCF_2OCF_2OCF_3$.

Additionally, combinations of the noted perfluorinated ethers may be used.

A component of the amorphous copolymer may generally includes an effective amount of cure site moieties derived from one or more compounds of the formula: a) $CX_2$=$CX$ (Z), wherein: (i) X is H or F; and (ii) Z is Br, I, Cl or R$_f$2—U wherein U=Br, I, Cl, or CN and R$_f$2=a perfluorinated divalent linking group optionally containing 0 atoms; or (b) Y(CF$_2$)$_g$Y, wherein: (i) Y is Br or I or Cl and (ii) q=1–6. Preferably the cure site moieties are derived from one or more compounds selected from the group consisting of $CF_2$=$CFBr$, $CF_2$=$CHBr$, $ICF_2CF_2CF_2CF_2I$, $CH_2I_2$, $BrCF_2CF_2Br$, $CF_2$=$CFO(CF_2)_3$—$OCF_2CF_2Br$, $CF_2$=$CFO CF_2CF_2Br$, $CH_2$=$CHCF_2CF_2Br$, $CH_2$=$CHCF_2CF_2I$, $CF_2$=$CFCl$ or mixtures thereof. In a most preferred embodiment, the iodine, bromine, or chlorine are chemically bound to chain ends of the first component of the compound. Optionally, nitrite cure site moieties may also be utilized. The crosslinkable composition can farther include one or more substances known to promote the formation of triazine rings by trimerization of nitriles under the influence of heat. These include organometallic compounds of arsenic, antimony, and tin described in U.S. Pat. Nos. 3,470,176, 3,546, 186, and the metal oxides described in U.S. Pat. No.3,523, 118, all herein incorporated by reference in their entirety.

The compound also includes a curable component that enables vulcanization of the fluoropolymer. The curable component may include curable materials, such as, for example, peroxide or one or more co-agents. Peroxide curatives include organic or inorganic peroxides. Organic peroxides are preferred, particularly those that do not decompose during dynamic mixing temperatures. Examples of non-limiting peroxides include dicumyl peroxide, 2,5-dimethyl-2,5-di(t-butylperoxy)hexane, di-t-butyl peroxide, t-butylperoxy benzoate, 2,5-dimethyl-2,5-di(t-butylperoxy) hexane-3 and laurel peroxide. Other suitable peroxide curatives are listed in U.S. Pat. No. 5,225,504 (Tatsu et at.). The amount of peroxide curing agent used generally will be 0.1 to 5, preferably 1 to 3 parts per 100 parts of fluoropolymer. Other conventional radical initiator are sutiable for use with the present invention.

In peroxide vulcanization of the fluorocarbon polymer using an organic peroxide, it is often desirable to include a co-agent. Those skilled in the art are capable of selecting conventional co-agents based on desired physical properties. Non-limiting examples of such agents include tri(methyl) allyl isocyanurate (TMAIC), triallyl isocyanurate (TAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. Another useful co-agent may be represented by the formula $CH_2=CH-R_f^1-CH=CH_2$ wherein $R_f^1$ is as described above. Such co-agents provide enhanced mechanical strength to the final cured elastomer. They generally are used in amount of 1 to 10 parts, or preferably 1 to 5 parts, per 100 parts of the fluorocarbon polymer.

The curable component also includes fillers that may improve the permeation rate of the compound. The fillers are included at about at least 10 parts per 100 parts of the first component of the compound. Non-limiting examples of fillers include carbon black, graphite, conventionally recognized thermoplastic fluoropolymer micropowders, clay, silica, talc, diatomaceous earth, barium sulfate, wollastonite, calcium carbonate, calcium fluoride, titanium oxide, and iron oxide. Combinations of conventional fillers may also be employed. Those skilled in the art are capable of selecting specific fillers at amounts in the noted range to achieve desired physical characteristics in the vulcanized compound.

Conventional adjuvants may also be incorporated into the compound of the present invention to enhance the properties of the compound. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are used in amounts ranging from about 1 to about 25 parts per 100 parts by weight of the polymer.

The polymers of this invention may be prepared using free radical batch or semi-batch, or continuous free radical emulsion polymerization processes. They may also be prepared by free radical suspension polymerization processes.

For example, if a continuous emulsion process is utilized, the polymers are generally prepared in a continuous stirred tank reactor. Polymerization temperatures may be in the range of 40° to 145° C., preferably 100° to 135° C. at pressures of 2 to 8 MPa. Residence times of 20 to 60 minutes are preferred. Free radical generation may be effected through use of a water-soluble initiator such as ammonium persulfate, either by thermal decomposition or by reaction with a reducing agent such as sodium sulfite. An inert surface-active agent such as ammonium perfluorooctanoate may be utilized to stabilize the dispersion, usually in conjunction with addition of a base such as sodium hydroxide or a buffer such as disodium phosphate to control pH in the range 3 to 7. Unreacted monomer is removed from the reactor effluent latex by vaporization at reduced pressure. Polymer is recovered from the stripped latex by coagulation. For example, coagulation may be effected by reducing latex pH to about 3 by addition of acid, then adding a salt solution, such as an aqueous solution of calcium nitrate, magnesium sulfate, or potassium aluminum sulfate, to the acidified latex. The polymer is separated from the serum, then washed with water and subsequently dried. After drying, the product may be cured.

Chain transfer agents may be used in the polymerization in order to control the molecular weight distribution of the resulting polymers. Examples of chain transfer agents include isopropanol; methyl ethyl ketone; ethyl acetate; diethyl malonate; isopentane; 1,3-diiodoperfluoropropane; 1,4-diiodoperfluorobutane; 1,6- diiodoperfluorohexane; 1,8-diiodoperfluorooctane; methylene iodide; trifluoromethyl iodide; perfluoro(isopropyl) iodide; and perfluoro(n-heptyl) iodide. Polymerization in the presence of iodine-containing chain transfer agents may result in a polymer with one or two iodine atoms per fluoroelastomer polymer chain, bound at the chain ends (see for example U. S. Pat. No. 4,243,770 and U.S. Pat. No. 4,361,678, herein incorporated by reference in their entirety). Such polymers may have improved flow and processability compared to polymers made in the absence of a chain transfer agent. Generally, up to about 1 weight percent iodine chemically bound to fluoroelastomer chain ends will be incorporated into the polymer, preferably from 0.1–0.3 wt. %.

The crosslinkable fluoropolymer composition can be compounded with the curable component or mixed in one or several steps, using any of the usual rubber mixing devices such as internal mixers (e.g., Banbury mixers), roll mills, etc. For best results, the temperature of the mixture should not rise above about 120° C. During mixing it is necessary to distribute the components and additives uniformly throughout for effective cure.

The mixture is then processed and shaped, for example, by extrusion (for example in the shape of a hose or hose lining) or molding (for example, in the form of an O-ring seal). The shaped article can then be heated to cure the gum composition and form a cured elastomer article.

Pressing of the compounded mixture (i.e., press cure) is typically conducted at a temperature of about 95–230° C., preferably about 150–205° C., for a period of about 1 minute to about 15 hours, usually for about 1–10 minutes. A pressure of about 700–20,000 kPa, preferably about 3400–6800 kPa, is typically used in molding the composition. The molds first may be coated with a release agent and prebaked.

The molded vulcanizate is then usually post cured in an oven at a temperature of about 150–315° C., preferably at a temperature of about 200–260° C., for a period of about 2–50 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 4 hours or more.

The cured compound of the present invention exhibits a combination of beneficial physical characteristics relating to durometer, retraction at lower temperature (TR-10 and permeation rate when compared to conventional compounds. The compound exhibits a low durometer value, as indicated by the Shore A hardness test (ASTM D2240-02) of about 60 or greater, and preferably 65–85. The durometer value is an indication of the elasticity and viscoelastic behavior of the material. The compound also has a TR-10 of about −25° C. or less, and preferably −30° C. or less. The CE10 fuel permeation rate of the compound at 40° C., as measured using a modified version of the procedure described in ASTM D 814-95 (Reapproved 2000), as set forth in the Examples section below, is 65 (g-mm/m$^2$-day) or less, preferably 60 (g-mm/m$^2$-day) or less, most preferably about 55 (g-mm/m$^2$-day) or less. The resulting compound exhibits a solvent volume swell in Fuel K (CM85) for 70 hours at 40° C. of about 60% or less, according to ASTM D471-98. The combination of the noted physical characteristics make the curable compound wells suited for sealing applications that require low temperature performance with excellent permeation resistance.

The invention is further illustrated in the following examples.

EXAMPLES

In the following Examples and Comparative Examples all concentrations and percentages are by weight unless otherwise indicated. The fluoroelastomer gums were prepared according to the method described in U.S. Pat. No. 6,294,627, which is incorporated by reference in its entirety. The monomer composition ratios of the fluoroelastomers used in the Examples are shown in Table 1. The fluoroelastomer compounds, which are used in the Examples and Comparative Examples, also are summarized in Table 1. Table 2 summarizes the physical properties for Examples 1–5 and Comparative Examples 1–4. Unless otherwise noted, all amounts in Table 2 are expressed in parts by weight, or parts by weight per one hundred parts by weight of rubber (phr). As represented in the Tables, VDF is vinylidene fluoride, TFE is tetrafluoroethylene, PMVE is perfluoromethylvinylether, MV-31 is perfluoro-3-methoxypropyl vinyl ether ($CF_2=CFO(CF_2)_3OCF_3$), and CSM is cure site monomer.

Fluoropolymers

The fluoropolymers listed in Table 1 were used in this invention. The monomer composition ratio was determined by $^{19}F$-NMR. The Mooney viscosity of the materials was determined by ASTM 1646-00 (ML 1+10@ 121° C.). Results are reported in Mooney units. The glass transition points (Tg) were obtained from the midpoint temperature of the peak at a temperature rate of 20° C./min. No melting peak or point was detected for each polymer sample by differential scanning calorimetry (DSC) scan from 0 to 200° C.

Press-cured samples (150×75×2.0 mm sheets, unless otherwise noted) were prepared for physical property determination by pressing at about 6.9×10 3 kPa for 10 minutes at 177° C.

Post cure samples were prepared by placing a press-cured sample in a circulating air oven. The oven was maintained at 230° C. and the samples treated for 16 hours.

Tensile Strength at Break, Elongation at Break, and Modulus at 100% Elongation were determined using ASTM D 412-98 on samples cut from 2.0 mm sheet with ASTM Die D. Units are reported in Mega Pascals (MPa).

Durometer or hardness was determined using ASTM D 2240-02 Method A with a Type A-2 Shore Durometer. Units are reported in points.

Retraction at Lower Temperatures (TR-10) was determined using ASTM D 1329-88 (reapproved 1998) with ethanol as the cooling media. Units are reported in ° C.

Solvent Volume swell was determined with according to ASTM D 471-98 Method using Fuel K (CM85; 85% methanol, 7.5% iso-octane; 7.5% toluene by volume) at 40° C. for 70 hours.

Compression set (C/set) was determined byASTM D 395-01 Method B with 0.139 inch (3.5 mm) O-rings compressed for 70 hours at 200° C. Results are reported as percentages.

Glass transition temperature ($T_g$) and detection of melting peak or point ($T_m$, an endothermic process) was determined in accordance with ASTM D 793-01 and ASTM E 1356-98 by a Perkin-Elmer differential scanning calorimetry DSC 7.0 under a nitrogen flow and a heating rate of 20° C./min. DSC scan was obtained from −40° C. to 200° C. at 20° C./min. scan rate.

Fuel permeation constant was determined by the following method. A post cured sheet (press cure: 10 mintues at 177° C., post cure: 16 hours at 230° C.) was cut into a disc having a diameter of 7.72 cm and used for permeation testing. Permeation constants were obtained using the pro-

TABLE 1

| Fluoro-elastomer | Monomer composition ratio (mol %) | | | | | DSC scan (−60 to 200° C.) | | Mooney viscosity |
|---|---|---|---|---|---|---|---|---|
| | VDF | TFE | MV-31 | PMVE | CSM | Tg (° C.) | melt peak | (ML 1 + 10 @ 121° C.) |
| LTFE 1 | 57.9 | 21 | 20.9 | 0 | 0.2 | −41 | N/D | 110 |
| LTFE 2 | 59 | 20 | 9.3 | 11 | 0.7 | −32 | N/D | 70 |
| GLT305 | 77 | 5 | 0 | 18 | a CSM | −31 | N/D | 32 |

N/D: not detected.

Test Methods

Mooney viscosity was determined by ASTM 1646-00 (ML 1+10@ 121 ° C.). Results are reported in Mooney units.

Cure Rheology Tests were run on uncured, compounded admixtures using an Alpha Technology Moving Disk Rheometer (MDR) Model 2000 in accordance with ASTM D 5289-95 at 177° C., no preheat, 12 minute elapsed time (unless otherwise specified) and a 0.5° C. arc. Minimum torque (M L), Maximum torque (M H), i.e., highest torque attained during specified period of time when no plateau or maximum was obtained and Difference in Torque, ΔT, i.e., (M H–M L), were reported. Also reported were: ts 2 (time for torque to increase 2 units above M L), t'50 (time for torque to reach M L+0.5[M H–M L]), and t'90 (time for torque to reach M L+0.9[M H–M L ]).

cedure described in ASTM D 814-95 (Reapproved 2000) with the following changes or specifics: The glass jar of ASTM D 814 was replaced with a Thwing-Albert Vapometer Permeability Cup as described in ASTM E 96-00; the fluoropolymer side of the test specimen was oriented toward the test liquid; the gaskets used were made of Dyneon FE-5840Q elastomer (Shore A hardness of about 60) instead of neoprene rubber and were located on both the top and bottom of the test specimen; a circular disk of mesh screen was used on top of the gasket to prevent the test specimen from deforming during the test; the test liquid was 100 mL of CE 10 fuel (10% ethanol, 45% iso-octane; 45% toluene); and the test temperature was 40° C. The permeation constant (g-mm/m²-day) was calculated by measuring the weight loss for a 30-day period using Mettler AT 400 at an accuracy of 0.1 mg. A slope of the line obtained by the least squares fit of weight loss (grams) versus time (days) was divided by the area of the test specimen and multiplied by its thickness.

Example 1

The fluoroelastomer gum, LTFE-1 in the Table 1, and ingredients used in each composition were compounded on a two roll mill using standard methods. Triallylisocyanurate (TAIC) coagent (72% active ingredient, available as TAIC DLC-A from Harwick, Akron, Ohio), 2,5-dimethyl-2,5-di(t-butylperoxy)-hexane (50% active ingredient, available as Varox DBPH-50 from R. T. Vanderbilt, Norwalk, Conn.), zinc oxide (available as UPS-1 from Zinc Corporation of America, Monaca, Pa.), and carbon black (available as Thermax Mont., ASTM N990 from Cancarb Limited, Medicine Hat, Alberta, Canada) were combined with the other ingredients. The compositions of the compounded gums are summarized in Table 2.

The cure rheology of the samples was investigated by testing uncured, compounded mixtures using the Alpha Technology Moving Disk Rheometer (MDR) Model 2000 and the procedure described in ASTM D 5289-95. All samples exhibited good curing properties.

The solvent volume swell was obtained according to ASTM D 471-98 using Fuel K (CM85; 85% methanol, 7.5% iso-octane; 7.5% toluene by volume) at 40° C. for 70 hours.

A post cured sheet (press cure: 10 mintues at 177° C., post cure: 16 hours@230° C.) was cut into a disc having a diameter of 7.72 cm and used for permeation testing. Permeation constants (g-mm/m²-day) were obtained according to the above test method using CE 10 fuel (10% ethanol, 45% iso-octane; 45% toluene); and the test temperature was 40° C. The permeation constant results are summarized in Table 2.

Examples 2–3 and Comparative Example C1–C2

In Example 2 and 3 and Comparative Examples C1 and C2, the samples were prepared and tested as in Example 1 except different amounts of carbon black, TAIC coagent and Varox DBPH-50 were added to the fluoroelastomer. The test results are summarized in Table 2.

Example 4

In Example 4, the sample was prepared and tested as in Example 1 except the fluoroelastomer gum, LTFE 2 in the Table 1 was used and different amounts of carbon black, TAIC coagent and DBPH-50 were added to the fluoroelastomer. The test results are summarized in Table 2.

Example 5 and Comparative Example C3

In Examples 5, the sample was prepared and tested as in Example 4 except different amounts of carbon black, TAIC coagent and DBPH-50 were added to the fluoroelastomer. The test results are summarized in Table 2.

Comparative Example C4

In Comparative Example C4, the sample was prepared and tested as in Example 4 except Viton® GLT301 (available DuPont Dow Elastomers, LLC, Wilmington, Del.), which does not contain a perfluorinated ether of formula I or formula II as indicated by NMR analysis and has a Tg of −31 ° C., was used as fluoroelastomer instead of fluoroelastomer LTFE-1 or LTFE-2. Mooney viscosity ML 1+10/121° C. was 32. The fluoropolymer compound was prepared and tested as in Example 4. The compositions of the compounded gums and properties are summarized in Table 2.

Comparative Example C5

In Comparative Example C5, the sample was prepared and tested as in Comparative Example C5 except different amounts of carbon black. The compositions of the compounded gums and properties are summarized in Table 2.

TABLE 2

|  | Ex. 1 | Ex. 2 | Ex. 3 | Co. Ex. C1 | Co. Ex. C2 | Ex. 4 | Ex. 5 | Co. Ex. C3 | Co. Ex. C4 | Co. Ex. C5 |
|---|---|---|---|---|---|---|---|---|---|---|
| LTFE-1 | 100 | 100 | 100 | 100 | 100 |  |  |  |  |  |
| LTFE-2 |  |  |  |  |  | 100 | 100 | 100 |  |  |
| Viton ® GLT305 |  |  |  |  |  |  |  |  | 100 | 100 |
| N-990 | 50 | 55 | 90 | 10 | 30 | 45 | 60 | 30 | 30 | 35 |
| ZnO | 3 | 3 | 3 | 3 | 3 | 3 | 3 | 3 | 3 | 3 |
| TAIC (72% DLC) | 2.08 | 3.5 | 1.4 | 3.5 | 3.5 | 3.5 | 3.5 | 3.5 | 3.5 | 3.5 |
| Varox DBPH-50 (50% Al) | 2.5 | 2.5 | 2 | 2.5 | 2.5 | 2.5 | 2.5 | 2.5 | 2.5 | 2.5 |
| MDR at 177° C., 0.5° Arc, 100 cpm, 12 Minutes | | | | | | | | | | |
| ML (dN-m) | 3.7 | 4.5 | 9.7 | 3.9 | 2.9 | 2.2 | 2.8 | 0.6 | 1.1 | 1.1 |
| MR (dN-m) | 18.4 | 18.8 | 30.7 | 14.4 | 12.8 | 17.4 | 21.2 | 11.9 | 19.5 | 19.2 |
| MH-ML (dN-m) | 14.7 | 14.3 | 20.9 | 10.5 | 9.8 | 15.2 | 18.3 | 11.3 | 18.4 | 18.1 |
| TS 2, min | 0.4 | 0.5 | 0.4 | 0.54 | 0.6 | 0.6 | 0.5 | 0.7 | 0.4 | 0.4 |
| t'50, min | 0.7 | 0.9 | 1.0 | 0.7 | 0.8 | 1.0 | 1.0 | 1.1 | 0.6 | 0.7 |
| t'90, min | 2.8 | 3.1 | 3.1 | 1.5 | 2.3 | 4.3 | 4.2 | 4.5 | 2.2 | 2.5 |
| Physical properties | | | | | | | | | | |
| Press Cure Time, 10 min. 177° C., | | | | | | | | | | |
| Tensile (MPa) | 11.8 | 12.1 | 12.9 | 9.2 | 10.7 | 12.1 | 11.6 | 13.6 | 16 | 14.3 |
| Elongation (%) | 190 | 167 | 140 | 190 | 218 | 245 | 210 | 311 | 236 | 217 |
| 100% Modulus (MPa) | 7.3 | 6.5 | 8.0 | 2.2 | 2.7 | 3.7 | 4.9 | 2.3 | 3.7 | 5.0 |
| Hardness (Share A2) | 70 | 71 | 82 | 55 | 59 | 69 | 74 | 64 | 67 | 67 |

TABLE 2-continued

|  | Ex. 1 | Ex. 2 | Ex. 3 | Co. Ex. C1 | Co. Ex. C2 | Ex. 4 | Ex. 5 | Co. Ex. C3 | Co. Ex. C4 | Co. Ex. C5 |
|---|---|---|---|---|---|---|---|---|---|---|
| | | | | Post cure Time, 16 h, 230° C. | | | | | | |
| Tensile (MPa) | 13.7 | 12.8 | 14.2 | 11.0 | 13.3 | 16.1 | 15.6 | 14.8 | 22.9 | 20.5 |
| Elongation (%) | 190 | 150 | 120 | 195 | 237 | 200 | 180 | 246 | 213 | 201 |
| 100% Modulus (MPa) | 5.4 | 7.4 | 14.2 | 2.3 | 3.0 | 5.6 | 7.1 | 2.9 | 5.8 | 7.2 |
| Hardness (Share A2) | 73 | 75 | 82 | 57 | 61 | 73 | 79 | 63 | 70 | 72 |
| Compression Set (%) | 26 | 29 | 28 | 15.2 | 22.4 | 36 | 37 | 29 | 35 | — |
| Fuel K (CM85) volume swell (%) 40° C., 70 hours | 10 | — | — | — | 10 | 12 | 10 | 16 | 98 | — |
| TR-10 (° C.) | −39 | −39 | −39 | −40 | −40 | −31 | −31 | −31 | −30 | — |
| Permeation constant CE10, 40° C. (g-mm/m²-day) | 55 | 63 | 50 | 89 | 82 | 49 | 46 | 63 | 68 | 66 |

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A compound comprising:
   (a) an amorphous copolymer including interpolymerized units derived from one or more perfluorinated ethers of the formula:

$$CF_2=CFO-(CF_2)_m-(O(CF_2)_p)_n-OR_f \quad \text{(Formula 1)}$$

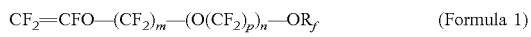

wherein $R_f$ is a perfluorinated (C1–C4)alkyl group, m=1–4, n=0–6, and p=1–2, or $$CF_2=CF(CF_2)_m-O-R_f \quad \text{(Formula II)}$$

wherein: m=1–4; $R_f$ is a perfluorinated aliphatic group optionally containing O atoms; and
   (b) a curable component including at least one filler, present in an amount of at least 10 parts per 100 parts of component (a), such that upon vulcanization the resulting compound has a Shore A hardness according to ASTM D2240 of 60 or greater, a TR-10 of −25° C. or less, and a permeation rate of 65 (g-mm/m²-day) or less.

2. The compound according to claim 1, wherein said compound includes terpolymers or quadpolymers.

3. The compound according to claim 1, wherein said copolymer includes vinylidene fluoride, tetrafluoroethylene, hexafluoro propylene, vinyl ethers, chloro trifluoro ethylene, pentafluoropropylene, vinyl fluoride, propylene, ethylene or combinations thereof.

4. The compound according to claim 1, wherein said compound is derived from ethylenically unsaturated monomers of the formula $CF_2=CFR_f$ where $R_f$ is fluorine or perfluoroalkyl of 1 to 8 carbon atoms.

5. The compound according to claim 1, further comprising an effective amount of cure site moieties derived from one or more compounds of the formula: a) $CX_2=CX(Z)$, wherein: (i) X is H or F; and (ii) Z is Br, I, Cl or $R_f2$—U wherein U=Br, I, Cl, or CN and $R_f2$=a perfluorinated divalent linking group optionally containing O atoms; or (b) $Y(CF_2)_qY$, wherein: (i) Y is Br or I or Cl and (ii) q=1–6.

6. The compound according to claim 5, wherein said cure site moieties are derived from $CF_2=CFBr$, $CF_2=CHBr$, $ICF_2CF_2CF_2CF_2I$, $CH_2I_2$, $BrCF_2CF_2Br$, $CF_2=CFO(CF_2)_3—OCF_2CF_2Br$, $CF_2=CFOCF_2CF_2Br$, $CH_2=CHCF_2CF_2Br$, $CH_2=CHCF_2CF_2I$, $CF_2=CFCl$ or mixtures thereof.

7. The compound according to claim 5, wherein said iodine or said bromine or said chlorine are chemically bound to chain ends of component (a).

8. The compound according to claim 1, wherein said one or more perfluorinated ethers include $CF_2=CFOCF_2OCF_3$, $CF_2=CFOCF_2CF_2OCF_3$, $CF_2=CFOCF_2CF_2CF_2OCF_3$, $CF_2=CFOCF_2CF_2CF_2CF_2OCF_3$, $CF_2=CFOCF_2OCF_2CF_3$, $CF_2=CFOCF_2CF_2OCF_2CF_3$, $CF_2=CFOCF_2CF_2CF_2OCF_2CF_3$, $CF_2=CFOCF_2CF_2CF_2CF_2OCF_2CF_3$ $CF_2=CFOCF_2CF_2OCF_2OCF_3$, $CF_2=CFOCF_2CF_2OCF_2CF_2OCF_3$, $CF_2=CFOCF_2CF_2OCF_2CF_2CF_2OCF_3$, $CF_2=CFOCF_2CF_2OCF_2CF_2CF_2CF_2OCF_3$, $CF_2=CFOCF_2CF_2OCF_2CF_2CF_2CF_2OCF_3$, $CF_2=CFOCF_2CF_2(OCF_2)_3OCF_3$, $CF_2=CFOCF_2CF_2(OCF_2)_4OCF_3$, $CF_2=CFCF_2OCF_2CF_2OCF_3$, $CF_2=CFOCF_2CF_2OCF_2OCF_3$, $CF_2=CFOCF_2CF_2OCF_2CF_3$, $CF_2=CFOCF_2CF_2OCF_2CF_2OCF_2CF_3$, $CF_2CF_3$, $CF_2=CFCF_2OCF_2CF_2OCF_3$, $CF_2=CFCF_2OCF_2OCF_3$, or combinations thereof.

9. The compound according to claim 2, wherein said quadpolymer includes tetrafluoroethylene, vinylidene fluoride, a perfluorinated vinyl ether of the formula $CF_2=CFOCF_2CF_2CF2OCF_3$, and a perfluoro(methyl vinyl) ether.

10. The compound according to claim 1, wherein said component (a) is formed by emulsion polymerization.

11. The compound according to claim 1, wherein said fillers include carbon black, graphite, thermoplastic fluoropolymer micropowders, clay, silica, talc, diatomaceous earth, barium sulfate, wollastonite, calcium carbonate, calcium fluoride, titanium oxide, iron oxide, or combinations thereof.

12. The compound of claim 1, further comprising acid acceptors.

13. The compound of claim 12, wherein said acid acceptors include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof.

14. The compound according to claim 1, wherein said compound has a solvent volume swell in FUEL K (CM85) of about 60% or less, according to ASTM D471-98.

15. The compound according to claim 1, wherein said curable component is peroxide curable.

16. The compound according to claim 1, wherein said one or more perfluorinated ethers corresponds to formula II and said curable component is a bisphenol curable compound.

17. An article comprising a cured compound according to claim 1.

18. A method of forming an elastomer, comprising vulcanizing a compound having:
(a) a copolymer including interpolymerized units derived from one or more perfluorinated ethers of the formula:

$$CF_2=CFO-(CF_2)_m-(O(CF_2)_p)_n-OR_f \qquad \text{(Formula I)}$$

wherein $R_f$ is a perfluorinated (C1–C4) alkyl group, m=1–4, n=0–6, and p=1–2, or $$CF_2=CF(CF_2)_m-O-R_f \qquad \text{(Formula II)}$$

wherein: m=1–4; $R_f$ is a perfluorinated aliphatic group optionally containing O atoms; and
(b) a curable component including at least one filler, present in an amount of at least 10 parts per 100 parts of component (a).

19. The method o claim 18, wherein said elastomer has a Shore A hardness according to ASTM D2240-02 of 60 or greater, a TR-10 of −25° C. or less, and a permeation rate of 65 (g-mm/m²-day) or less.

* * * * *

UNITED STATES PATENT AND TRADEMARK OFFICE
CERTIFICATE OF CORRECTION

| | |
|---|---|
| PATENT NO. | : 7,148,300 B2 |
| APPLICATION NO. | : 10/659877 |
| DATED | : December 12, 2006 |
| INVENTOR(S) | : Tatsuo Fukushi |

It is certified that error appears in the above-identified patent and that said Letters Patent is hereby corrected as shown below:

Column 2, Title Page (56)
U.S. Patent Documents, Line 6, delete "B1" following "6,380,337" and insert -- B2 -- in place thereof.
U.S. Patent Documents, Line 7, delete "B1" following "6,613,846" and insert -- B2 -- in place thereof.
U.S. Patent Documents, Line 8, delete "B1" following "6,640,331" and insert -- B2 -- in place thereof.
U.S. Patent Documents, Line 9, delete "B1" following "6,730,760" and insert -- B2 -- in place thereof.

Column 2, Title Page (56)
Foreign Patent Documents, Line 2, insert -- * -- following "195 42 501 A1".
Foreign Patent Documents, Line 15, delete "WO 98/58964" following "WO 98/14517" and insert -- WO 98/58984 -- in place thereof.
Foreign Patent Documents, Line 17, delete "WO 99/48939" following "WO-99/48939*".

Title Page (56) Page 2

Column 1
Other Publications, Line 8, delete "Robert," and insert -- Roberts, -- in place thereof.

Column 4
Line 31, delete "0" and insert -- O -- in place thereof.
Line 32, delete "$Y(CF_2)_gY$" and insert -- $Y(CF_2)_qY$, -- in place thereof.
Line 38, delete "$CF_2=CFC1$" and insert -- $CF_2$-CFCl -- in place thereof.
Line 42, delete "farther" and insert -- further -- in place thereof.

Column 9-10
Table 2, Line 13, delete "MR (dN-m)" below "ML (dN-m)" and insert
-- MH (dN-m) -- in place thereof.

Column 11
Line 35, Claim 1, delete "(Formula 1)" and insert -- (Formula I) -- in place thereof.
Line 41, Claim 1, delete "eontaining" and insert -- containing -- in place thereof.
Line 67, Claim 5, delete "$_q$=1-6." and insert -- q=1-6. -- in place thereof.

Column 12
Line 49, Claim 9, delete "CF2" and insert -- $CF_2$ -- in place thereof.

UNITED STATES PATENT AND TRADEMARK OFFICE
CERTIFICATE OF CORRECTION

PATENT NO. : 7,148,300 B2 Page 2 of 2
APPLICATION NO. : 10/659877
DATED : December 12, 2006
INVENTOR(S) : Tatsuo Fukushi It is certified that error appears in the above-identified patent and that said Letters Patent is hereby corrected as shown below:

<u>Column 14</u>
Line 10, Claim 19, delete "o" and insert -- of -- in place thereof.

Signed and Sealed this

Twentieth Day of March, 2007

JON W. DUDAS
*Director of the United States Patent and Trademark Office*